(12) United States Patent
Jackson (10) Patent No.: US 10,145,074 B2
(45) Date of Patent: Dec. 4, 2018

(54) SYSTEM FOR REMOVING AN OIL FROM A SURFACE OF A BODY OF WATER

(71) Applicant: Wallace Jackson, St. Johns (CA)

(72) Inventor: Wallace Jackson, St. Johns (CA)

( * ) Notice: Subject to any disclaimer, the term of this patent is extended or adjusted under 35 U.S.C. 154(b) by 558 days.

(21) Appl. No.: 14/121,590

(22) Filed: Sep. 22, 2014

(65) Prior Publication Data

US 2016/0083922 A1     Mar. 24, 2016

(51) Int. Cl.
    *E02B 15/04* (2006.01)
(52) U.S. Cl.
    CPC .......... *E02B 15/048* (2013.01); *E02B 15/046* (2013.01); *Y02A 20/204* (2018.01)
(58) Field of Classification Search
    CPC ..... B63B 35/32; E02B 15/048; E02B 15/046; Y02A 20/204
    See application file for complete search history.

(56) References Cited

U.S. PATENT DOCUMENTS

| | | | | |
|---|---|---|---|---|
| 3,495,561 | A * | 2/1970 | Trapp | E02B 15/048 114/267 |
| 3,752,317 | A * | 8/1973 | Lithen | B63B 35/32 210/242.3 |
| 4,796,773 | A * | 1/1989 | Gerhard | B60P 3/24 220/563 |
| 4,921,605 | A * | 5/1990 | Chastan-Bagnis | E02B 15/046 210/115 |
| 5,047,156 | A * | 9/1991 | Sullivan | E02B 15/046 210/242.3 |
| 5,194,151 | A * | 3/1993 | Broussard | E02B 15/046 210/242.3 |
| 6,174,436 | B1 * | 1/2001 | Kim | B63B 35/32 210/242.3 |
| 8,048,300 | B1 * | 11/2011 | Ness | B63B 35/32 210/242.1 |
| 9,039,895 | B1 * | 5/2015 | Riley | E02B 15/103 114/219 |
| 2006/0144774 | A1 * | 7/2006 | Joliet | B63B 35/32 210/242.1 |
| 2010/0314329 | A1 * | 12/2010 | Prior | B63B 35/32 210/747.6 |
| 2011/0297597 | A1 * | 12/2011 | Di Bella | B01D 21/0027 210/170.05 |
| 2011/0297608 | A1 * | 12/2011 | Crouse | E02B 15/046 210/242.3 |
| 2011/0303616 | A1 * | 12/2011 | Cox | B01D 21/0027 210/747.6 |

(Continued)

*Primary Examiner* — Christopher R Harmon
(74) *Attorney, Agent, or Firm* — Mu P.C.

(57) ABSTRACT

A system for removing an oil from a surface of a body of water including a vessel capable of floating on the body of water, with a bow arrangement having a port and a starboard deflector plate and with a downward facing deflector plate, a flow control foil attached to the bow arrangement below the surface of water, a horizontal elongated roller capable of breaking solidified fluids mounted just above the control foil. Behind and below the bow arrangement is a flow opening on the vessel underside where the flow opening is openly submerged below the surface of water. The system includes a separation compartment with walls, a roof, an open bottom and an oil pump having an inlet located near the top of the separation compartment and connected for transfer of collected oil to an onboard or remote storage unit.

13 Claims, 8 Drawing Sheets

(56) References Cited

U.S. PATENT DOCUMENTS

| | | | |
|---|---|---|---|
| 2012/0067806 A1* | 3/2012 | Clauss | B63B 35/32 210/242.1 |
| 2014/0021113 A1* | 1/2014 | Caraballo Benitez | B63B 35/32 210/170.1 |
| 2014/0158603 A1* | 6/2014 | Cantrell | E02B 15/048 210/242.3 |
| 2014/0197176 A1* | 7/2014 | Pearce | B60K 15/077 220/563 |
| 2016/0024736 A1* | 1/2016 | Jauncey | B01D 17/0214 210/747.6 |
| 2016/0318776 A1* | 11/2016 | Kim | B01D 17/0214 |

* cited by examiner

SYSTEM FOR REMOVING AN OIL FROM A SURFACE OF A BODY OF WATER

FIELD OF INVENTION

This invention relates generally to a system used to remove oils from the surface of a body of water, and more specifically to a system designed to remove fluids with lower density than water, where fluids have been spilled on or near the surface of the water, and to separate such fluids from the water.

BACKGROUND

To remove spilled oil such as Marine C-class boiler fuel oil, crude oil, diesel, kerosene, gasoline, plant and/or corn oils, and other such liquids or fluids from sea water or fresh water. All of these in this description is referred to as "oil" and in order to provide the specifications, for the purpose of description, the word "oil" here refers to each of these materials, unless otherwise specifically named. In the modern offshore oil drilling and exploration, pumping operation, transportation of or storage and handling activities, it is important to realize the scope of the problems. Transportation activities include oil tankers, shipping vessels, tank cars, tank trailers, pipelines and storage tanks. The storage tanks are usually nearby fresh water or seawater for ease of transport. Oil leakage in water can lead to very harmful and serious environmental and ecological disasters. In order to minimize the influence of such leakage or spill, it is necessary that the spill be cleaned and removed as quickly as possible.

Oil recovery systems are generally well known, whereas the present invention offers unique properties, the advantages of which are listed below in the Summary of the Invention.

Past inventions that include systems which incorporate some or part of the basics of the present invention are numerous. Inventor is aware of U.S. Pat. No. 8,382,978 issued to Prior on Feb. 26, 2013 and entitled Device And Method For Cleaning Up Spilled Oil And Other Liquids; U.S. Pat. No. 8,652,325 issued to Prior on Feb. 18, 2014, entitled Device And Method For Cleaning Up Spilled Oil And Other Liquids; U.S. Pat. No. 5,194,164 issued to Adams, on Mar. 16, 1993, entitled Inclined-Plane Oil Skimmers; U.S. Pat. No. 8,696,914 issued to Clauss, et al. on Apr. 15, 2014, entitled Apparatus And Method For Picking Up Particles From The Surface Of A Water System; all of which are listed here for reference purpose only.

SUMMARY OF THE INVENTION

This unique designed system is used to remove fluids of different densities from water, such as oil and other liquids. This system includes a vessel floating on the surface of the body of water with a bow arrangement having port and starboard deflector plates, a flow control foil or hydrofoil, a roller for breaking solidified fluids, an opening on the vessels underside that is generally parallel to the direction of flow towards the separation compartment, an oil separation compartment, oil sensors, and oil pump(s) that may be locally or remote of a containment tank(s).

The oil separation compartment is located within the hull cavity of a vessel downstream of the bow arrangement. The opening of the separation compartment is at the bottom of the separation compartment and is submerged in water and or other fluids. The oil pump is connected close to the top of the separation compartment, and is suitable for the transfer of oil and or other fluids from the oil separation compartment.

Accordingly, a principal object of this invention is to provide a system with relatively few mechanical parts that could create problems and high maintenance costs and that can be used to quickly and thoroughly remove oil from a body of water, and a system that can be readily transported from one location to another location.

A further object of the present invention to provide a vessel suitable for floating on a body of water with spilled oil, with a system that can be used for quick separation of the oil fluids and assist in environmental protection. A still further object of the present invention is to provide a system for retrofitting to various types of existing vessels that are suitable for floating on a body of water and on spilled oil.

Yet another object of the present invention is to provide a system that is capable of transferring the collected oil to both onboard and remote storage facilities.

The present invention has other objects and features of advantage, which will become apparent from and are set forth in more detail in the description and the accompanying drawings.

BRIEF DESCRIPTION OF DRAWINGS

Advantages of the present invention will become more fully appreciated as the same becomes better understood when considered in conjunction with the following detailed description of an illustrative embodiment and accompanying drawings, in which like reference characters designate the same or similar parts throughout the several views, wherein.

DETAILED DESCRIPTION OF THE PREFERRED EMBODIMENTS

Figure 1:
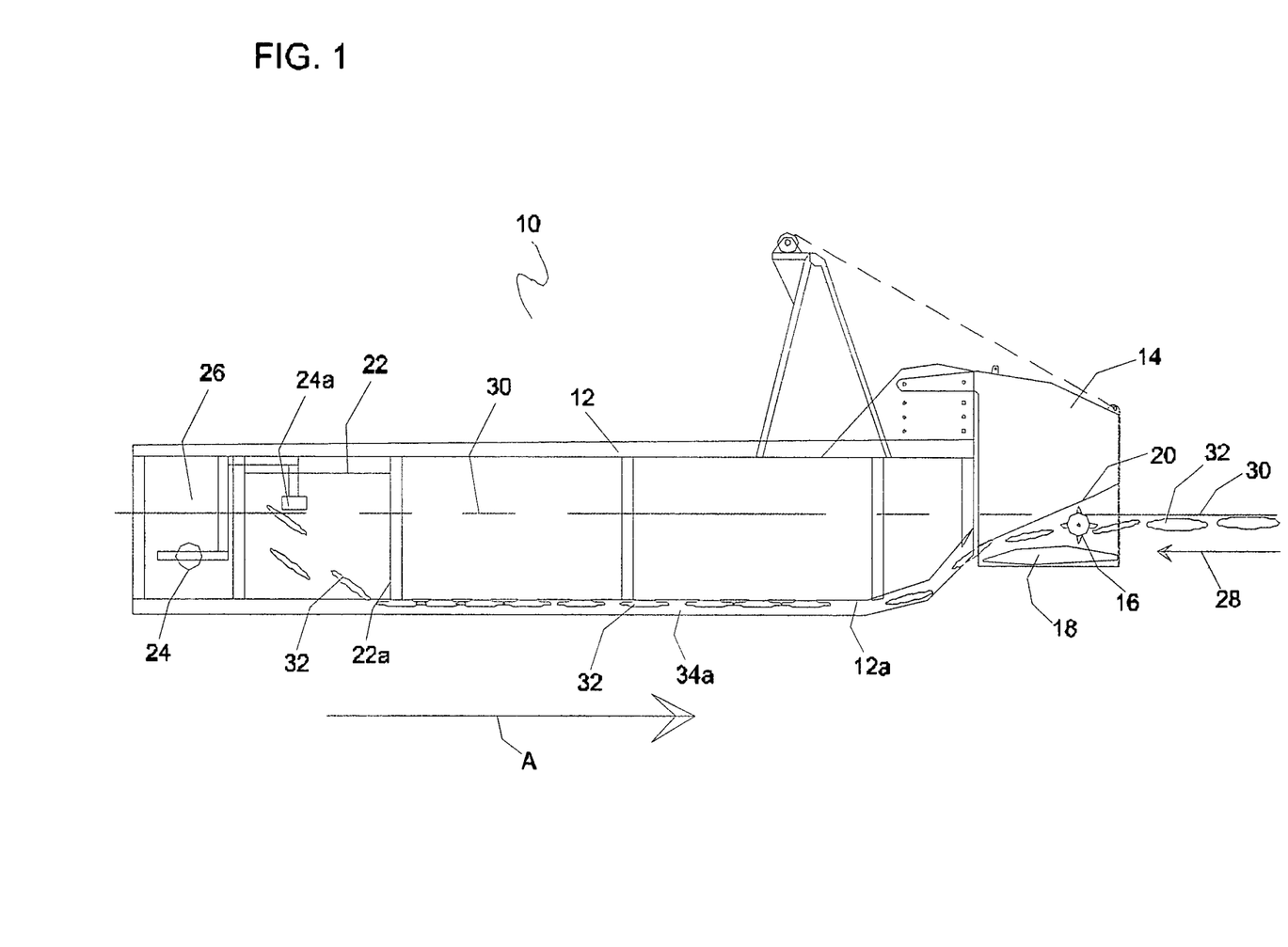
FIG. 1 is a side elevational view of the system for removing an oil from the surface of a body of water, according to the preferred embodiment of the present invention, showing an overall view including the water line and direction of water flow in respect to the direction of travel of the vessel.

Referring to FIG. 1 where a side elevational view shows the system used to remove oil from the surface of a body of water, according to the preferred embodiment of the present invention, which is generally referred to here as system 10. System 10 includes a vessel 12 and a bow arrangement 14, with roller 16, foil 18 and downward deflector 20.

System 10 further includes an oil separation compartment 22, an oil pump 24, with suction 24a and an optional onboard oil tank 26. The direction of the body of water in relation to vessel 12 is shown with arrow 28. The water line 30, of a body of water is approximate as the water line 30 will vary slightly. For illustrative purposes oil 32 is shown simulated as oval shapes. The starboard side of flow tunnel opening 34 is shown here as starboard sidewall 34a, where port sidewall is 34b. The bottom of flow opening is open to the body of water and the top of flow tunnel opening is the bottom hull 12a of vessel 12.

Figure 2:
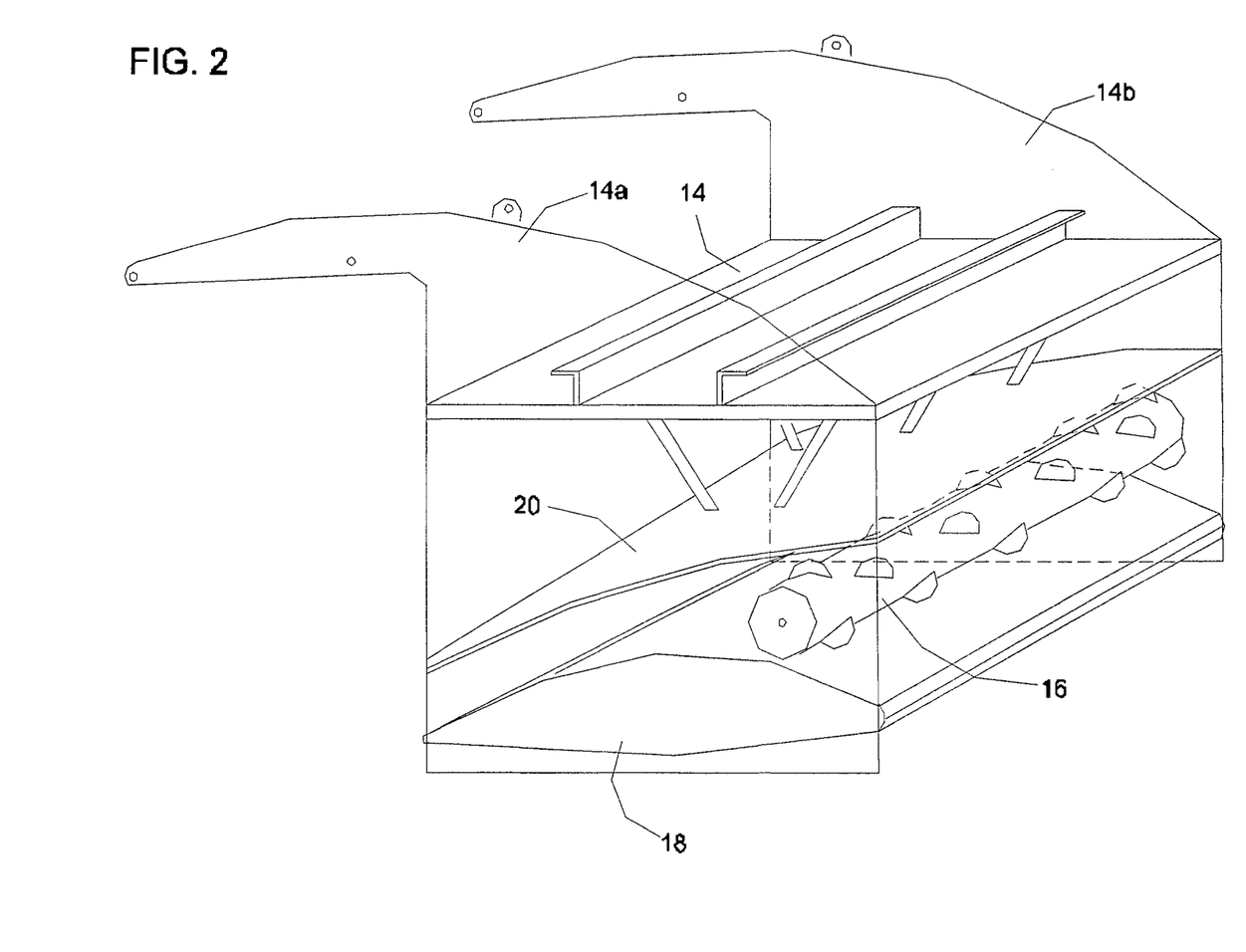
FIG. 2 is a frontal partial cutaway perspective view of the system for removing an oil from the surface of a body of water, according to the preferred embodiment of the present invention, showing the bow arrangement.
Figure 3:
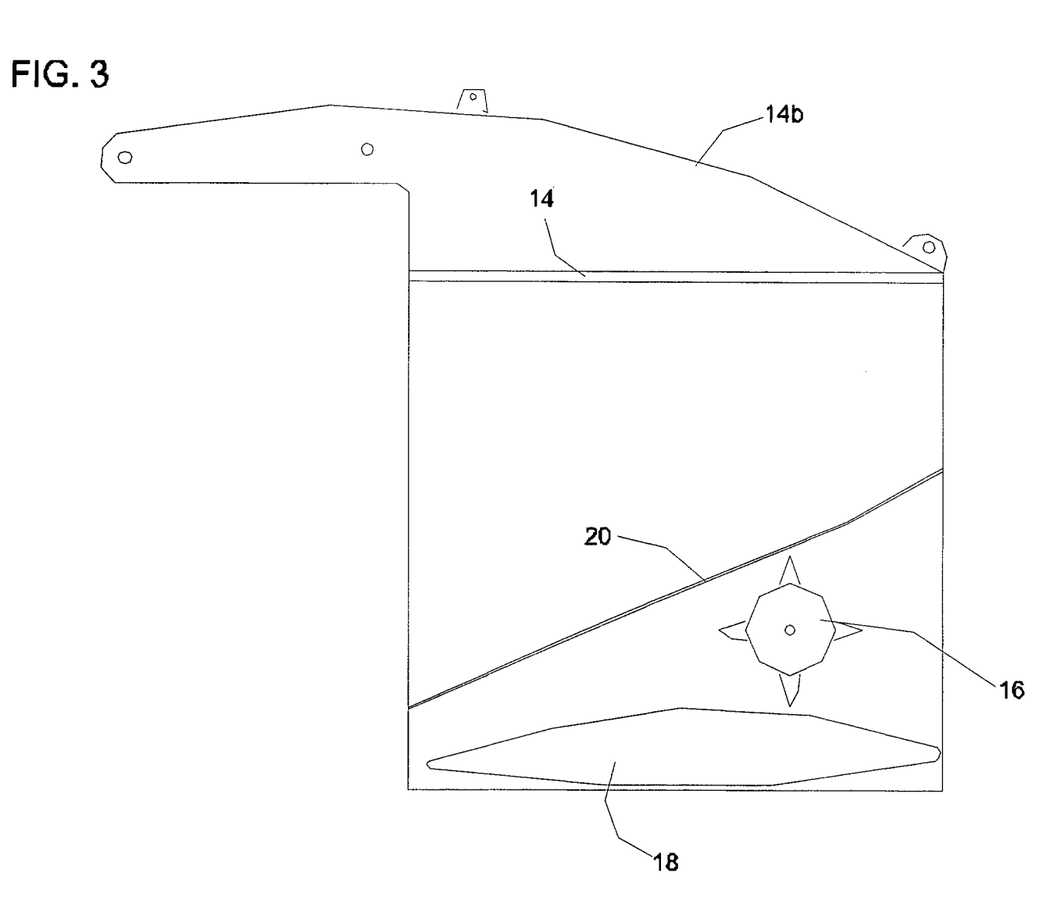
FIG. 3 is a side cutaway elevational view of the system for removing an oil from the surface of a body of water, according to the preferred embodiment of the present invention, showing the bow arrangement with the roller attached.
Figure 4:
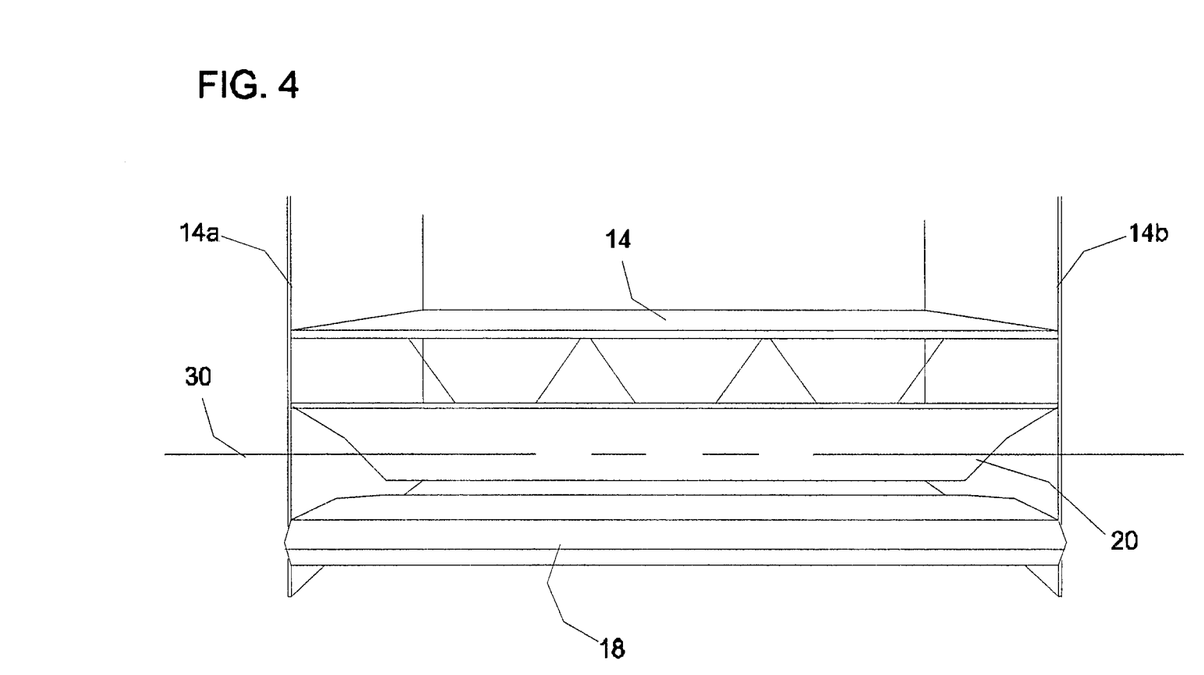
FIG. 4 is a front elevational view of the system for removing an oil from the surface of a body of water, according to the preferred embodiment of the present invention, showing the bow arrangement with the roller removed.

FIG. 2 shows the bow arrangement 14 in a perspective view separate from the vessel 12, where FIG. 3 shows the bow arrangement 14 in a cutaway view with roller 16 attached. FIG. 4 shows bow arrangement 14 with roller 16 removed.

Figure 5:
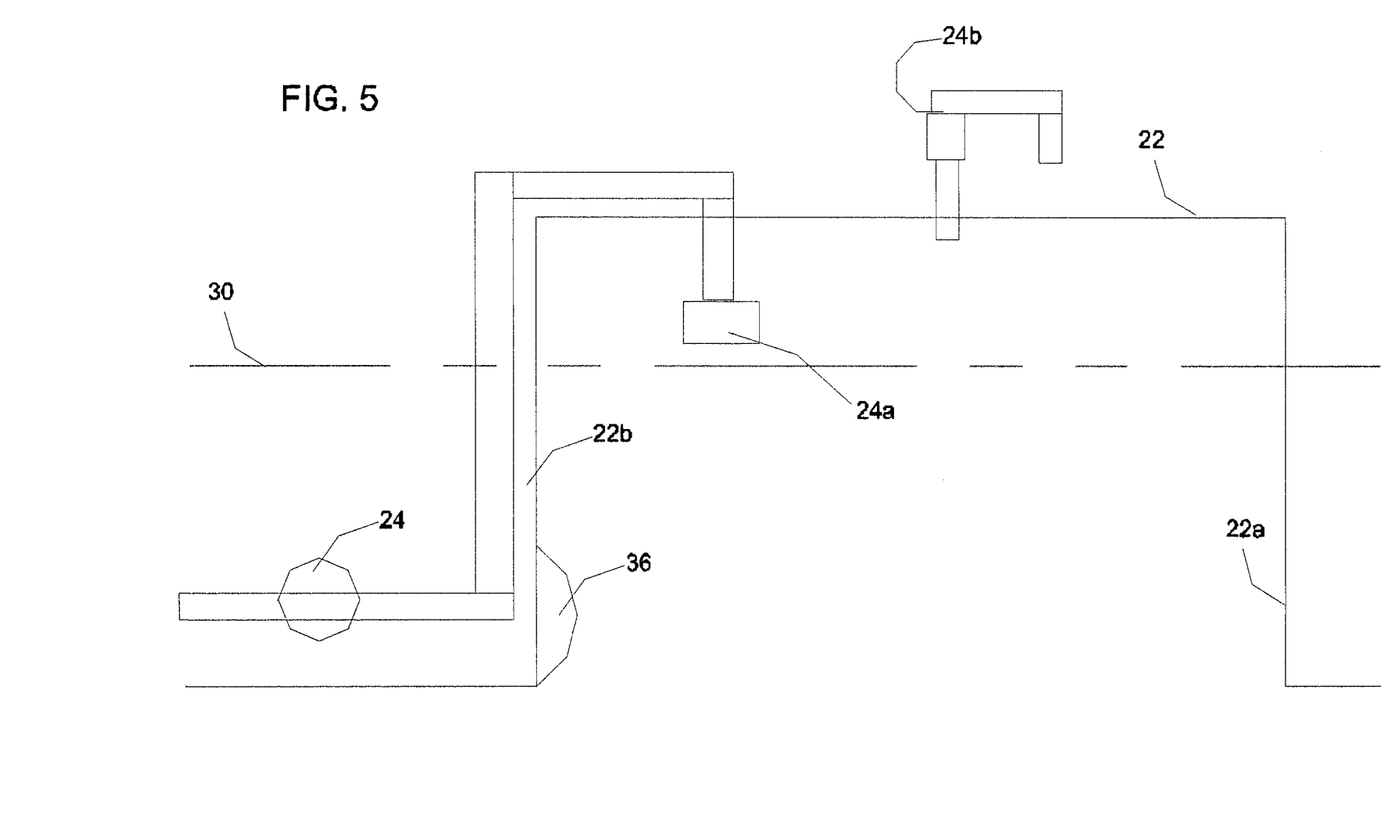
FIG. 5 shows a side elevational sectional view of the system for removing an oil from the surface of a body of water, according to the preferred embodiment of the present invention, showing the oil separation compartment with the horizontal elongated convex attachment on the bottom of the rear wall of the oil separation compartment used to reduce flow turbulence in the separation compartment as the vessel is moving in a forward direction.

FIG. 5 shows oil separation compartment 22 cutaway, showing a horizontal elongated convex buffer attachment 36 on the bottom of rear wall 22b of the oil separation compartment 22 used to reduce flow turbulence in separation compartment 22 as vessel 12 is moving in a forward direction "A". A suction filter 24a, suitable for its intended purpose, to protect pump 24 from debris while transferring oils and other liquids. Pressurized air relief 24b that will allow any trapped and pressurized air to escape from within oil separation compartment 22.

Figure 6:
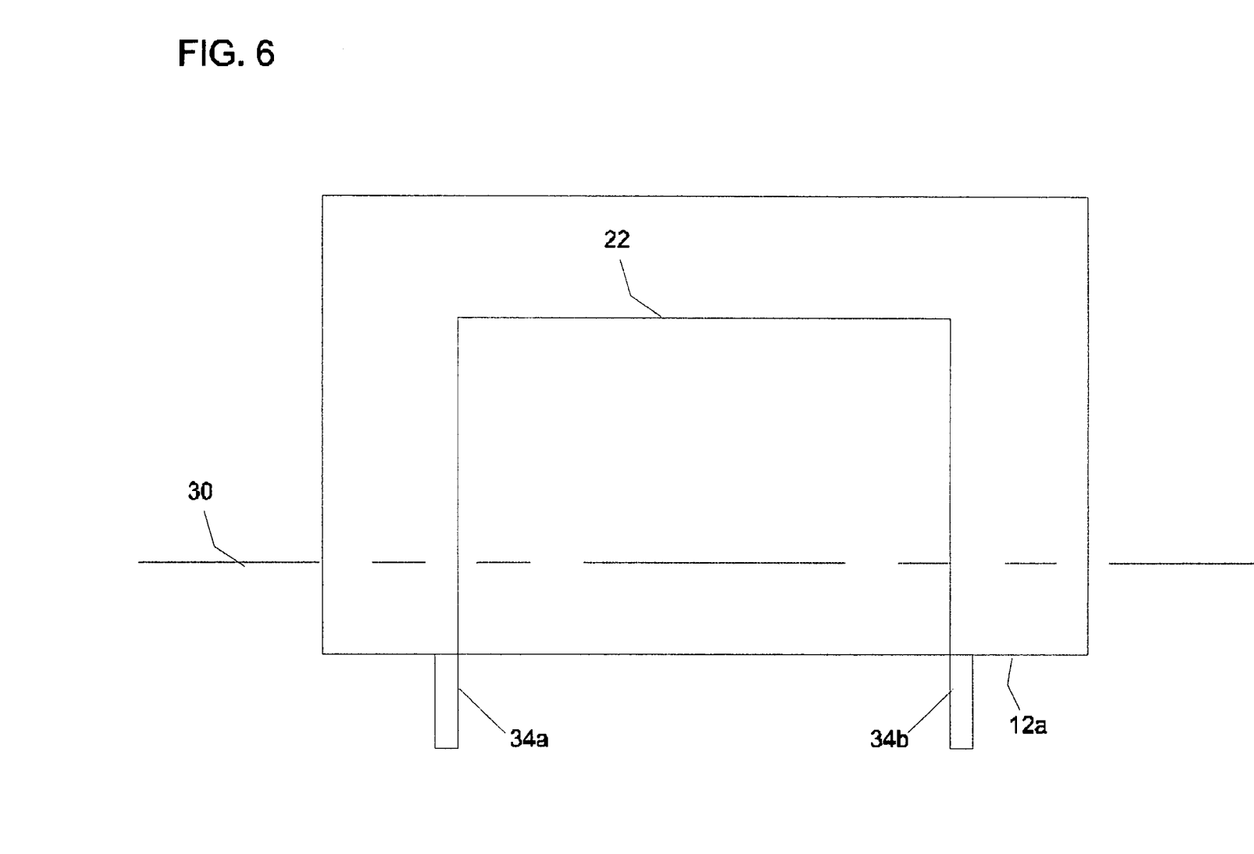
FIG. 6 shows a sectional front elevational view of the system for removing an oil from the surface of a body of water, according to the preferred embodiment of the present invention, showing the separation compartment orientation with respect to the vessel and side plates of the flow tunnel opening.
Figure 7:
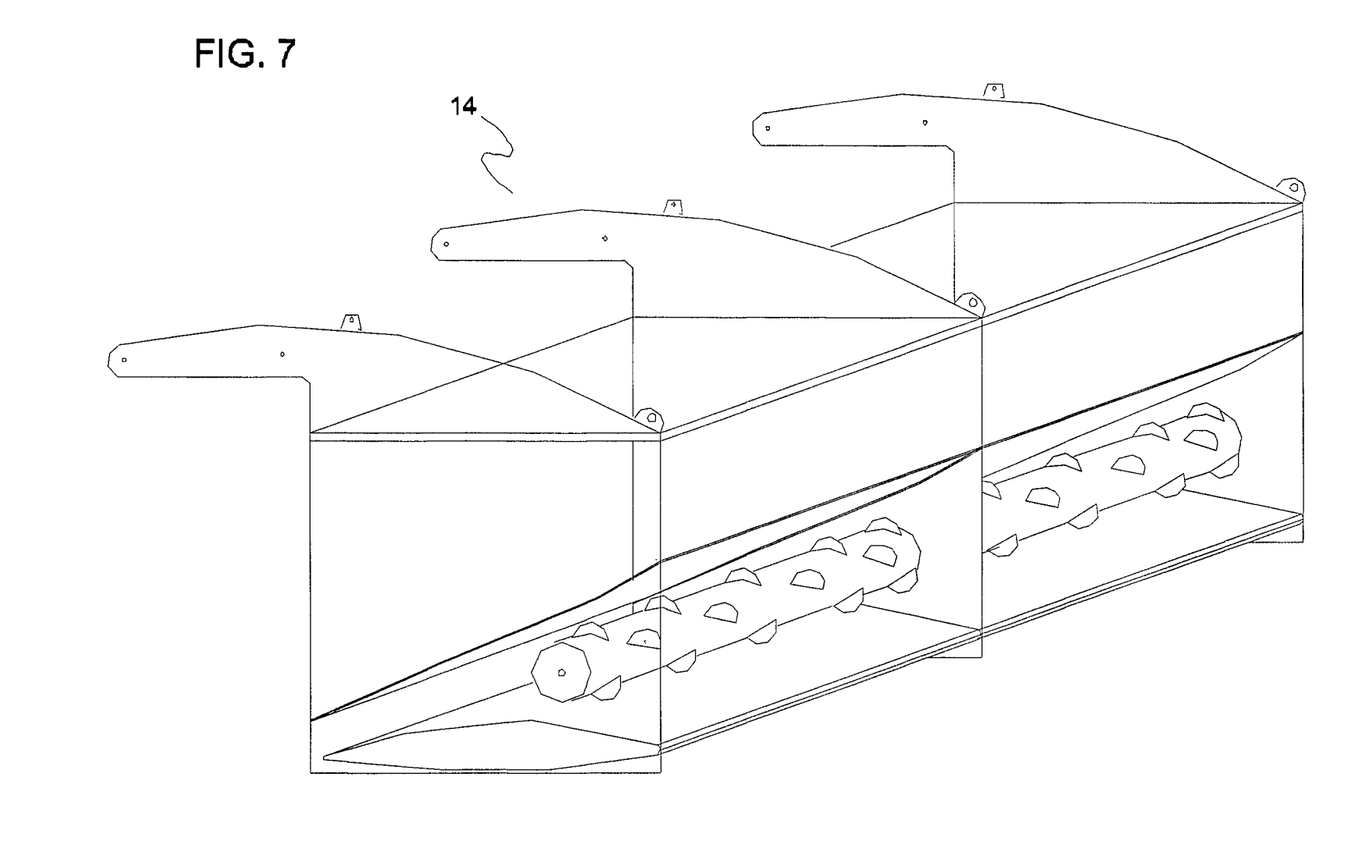
FIG. 7 is a frontal perspective view of the system for removing an oil from the surface of a body of water, optional embodiment of the present invention, showing the bow arrangement doubled in a side by side arrangement for wider vessels.
Figure 8:
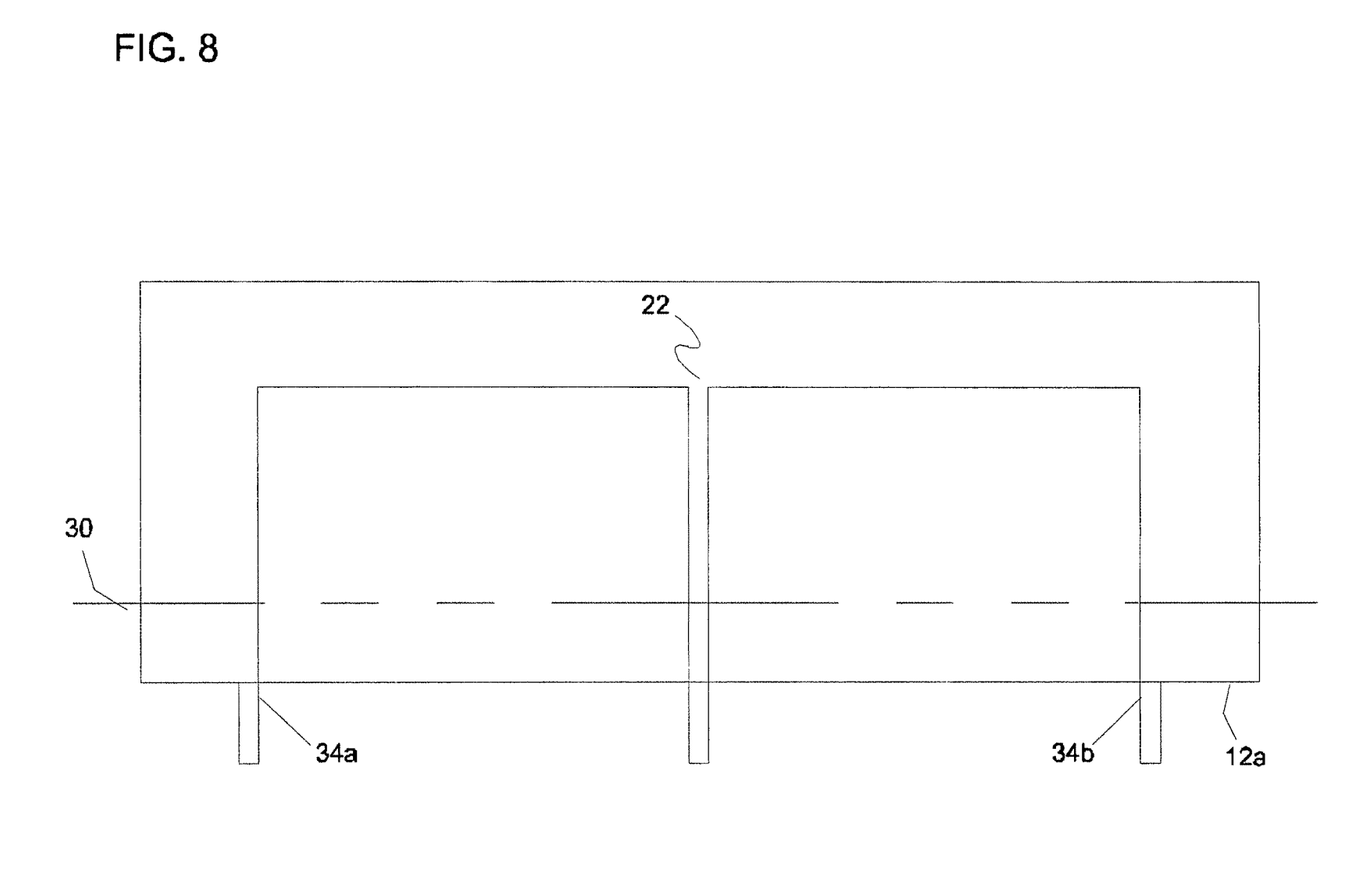
FIG. 8 is a sectional front elevational view of the system for removing an oil from the surface of a body of water, optional embodiment of the present invention, showing the separation compartment doubled in a side by side arrangement for wider vessels.

FIG. 6 shows the oil separation compartment 22 as a cutaway of vessel 12, showing starboard side plate 34a of flow tunnel opening 34 and port side plates 34b. FIG. 7 shows the bow arrangement 14 doubled in a side by side arrangement as an option for wider vessels. FIG. 8 shows the separation compartment 22 doubled in a side by side arrangement as an option for use in wider vessels behind the doubled bow arrangement 14.

In operation, FIG. 1 provides a view of vessel 12, in general and in an overall forward direction "A". Vessel 12 can be either self propelled, pushed or towed, through an area of contaminated water. The bow arrangement 14 is connected to bow section of vessel 12 and is suitable for deflecting oil and water towards flow tunnel opening 34 under vessel 12. between deflector 20 and foil 18, where the oil and water will leave bow arrangement 14 to flow tunnel opening 34 to be directed below vessel 12. Foil 18 is used to maximize the flow of fluids through bow arrangement 14 and thereby increase the depths the oil and water can be projected in a downward direction to flow tunnel opening 34. A roller 16 is used to break solidified fluids for better collection and separation results. The deflector plate 20 is used to deflect the oil and water in a downward direction below vessel 12 for ease of collection and separation in the oil separation compartment 22. The bow arrangement 14 includes starboard side plates 14a and port side 14b. The side plates 14a and 4b of the bow arrangement 14 can be made of aluminium, steel, fibreglass or a combination of, or other suitable materials for the intended purpose.

The vessel 12 is in a forward motion "A", the oil 32 are projected in a downward motion between deflector 20 surface and the foil 18, and after that, as vessel 12 continues to move forward, oil 32 will continue moving aft, below vessel 12, until it reaches leading wall 22a of oil separation compartment 22 as demonstrated in FIG. 1. Oil separation compartment 22 has smooth and vertical walls on all 4 sides. Oil 32 accumulates at the top of oil separation compartment 22 and oil 32 is transferred via oil pump 24 to storage tank 26, or to one or more tanks (not shown) which can be carried on or in vessel 12, or for example in storage bags, or other appropriate storage facilities (not shown) in close proximity, or away from the location of vessel 12.

Oil sensors (not shown) detect the existence of oil 32 in oil separation compartment 22 and are connected to automated electronic or other switch connections between oil separation compartment 22 and the oil pump 24. As vessel 12 continues movement in a forward direction "A", it continues over the oil and water, which is passed under vessel 12 to the oil separation compartment 22, and vessel 12 continues movement in forward direction "A" until all of the oil have been collected. The oil separation compartments rear or stern wall 22b will have an elongated convex attachment 36 either rounded or triangular shaped, to reduce turbulence from oil and water flow as vessel 12 is in forward movement "A". A length of tube (not shown) is the preferred heating method and is connected to the hull 12a at tunnel 34, thus when the oil 32 passes through tunnel 34 towards the oil separation compartments 22, the heat makes contact with the oil and water and thus heat oil 32 for greater buoyancy of oil 32.

Starboard side plate 34a of tunnel opening 34 and port side plates 34b will extend beyond the hull of the vessel, under the surface in a downward direction, and side plate 34a side plate 34b along the vessel 12's hull may be outspread, so when the vessel is moved in a forward direction "A" over the spilled oil 32, so starboard side plate 34a and port side plates 34b can further assist in directing the oil 32 under hull 12a through flow tunnel opening 34 until it reaches the oil separation compartment 22.

Ballast (not shown) can be added to vessel 12 to lower or raise waterline 30 according to water depths, in order to provide buoyancy and or stability. The height of bow arrangement 14 can also be adjusted to suit the waterline level of vessel 12, so that vessel 12 draft can be increased or reduced, thus changing the lower end of oil separation compartment 22 immersion depth without interference with the collection and separation abilities. Oil separation compartment 22 may include a series of horizontally spaced bars (not shown) that can be implemented across the bottom of the oil separation compartment openings, in order to prevent or reduce the possibility of ice or debris accumulating in oil separation compartment 22. Optionally, the series of horizontally spaced bars can be heated to reducing oil viscosity and density, and increase oil 32 flow abilities, and can also be designed as to reduce turbulent flow.

The foregoing descriptions of specific embodiments of the present invention have been presented for purposes of illustration and description.

They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. While the invention has been described in its preferred embodiments, it is to be understood that the words which have been used are words of description and not of limitation. Therefore, changes may be made within the appended claims without departing from the true scope of the invention.

It is intended that the scope of the invention be defined by the Claims appended hereto and their equivalents, which should be given their fair and fullest scope.

What is claimed is:

1. A vessel for removing oil from the surface of a body of water, comprising:
    an open bow arrangement for collection of oil residing on the water surface having a flow control foil positioned below a water line of said body of water;
    a deflector plate positioned above said flow control foil at a downward angle toward the stern of said vessel;
    an elongated roller disposed between said flow control foil and said deflector plate for breaking down solidified fluids;
    a flow tunnel disposed along a hull underside of said vessel for receiving collected oil and water from said bow arrangement; and
    a separation compartment connected to said flow tunnel for receiving oil and water therefrom and performing separation of oil and water, wherein forward motion of said vessel over said body of water exclusively creates flow of oil and water between said flow control foil and said deflector plate and through said flow tunnel.

2. The vessel of claim 1 including at least one oil pump for pumping oil from said separation compartment.

3. The vessel of claim 2 wherein the oil pump is a screw type pump.

4. The vessel of claim 2 where the oil pump is an atmospheric mounted diaphragm pump.

5. The vessel of claim 1, where the separation compartment is rectangular-shaped, the said separation compartment including an opening for admitting water and oil.

6. The vessel of claim 5, wherein the separation compartment includes a horizontal elongated convex attachment configured to curb water turbulence.

7. The vessel of claim 6, where horizontal elongated convex attachment is round shaped.

8. The vessel according to claim 6, where said horizontal elongated convex attachment is triangular shaped.

9. The vessel according to claim 6, wherein the separation compartment includes a front wall and wherein the horizontal elongated convex attachment is about 10 percent to 20 percent of the height of the front wall for the curbing of water turbulence.

10. The vessel according to claim 1, where said separation compartment includes at least one oil sensor configured for automated control.

11. The vessel according to claim 5, wherein the separation compartment includes a front wall and a rear wall and a plurality of spaced-apart heating bars extending from the front wall to the rear wall.

12. The vessel according to claim 11, wherein the bars are spaced apart a distance of between about 4 to about 9 percent of distance from the separation compartment opening.

13. The vessel of claim 11 wherein the bars are hollow tubes used for heating oil entering said separation compartment opening of said separation compartment.

* * * * *